United States Patent [19]

Young et al.

[11] Patent Number: 5,551,526

[45] Date of Patent: Sep. 3, 1996

[54] MODULATED FWD CLUTCH FOR TRACTOR BRAKING

[75] Inventors: Steven C. Young, Lancaster; Thomas L. Stiefvater; John H. Posselius, Jr., both of Ephrata, all of Pa.

[73] Assignee: New Holland North America, Inc., New Holland, Pa.

[21] Appl. No.: 311,618

[22] Filed: Sep. 23, 1994

[51] Int. Cl.⁶ ................................................. B60K 23/08
[52] U.S. Cl. .................. 180/233; 364/424.1; 180/244; 192/13 R
[58] Field of Search ........................... 180/233, 244, 180/245, 247; 364/424.1, 426.01; 192/12 R, 13 R, 9

[56] References Cited

U.S. PATENT DOCUMENTS

| | | | |
|---|---|---|---|
| 4,466,519 | 8/1984 | Romer | 192/13 R |
| 4,582,159 | 4/1986 | Suzuki | 180/247 |
| 4,811,811 | 3/1989 | Bergene | 180/244 |
| 4,878,559 | 11/1989 | Moon et al. | 180/244 |
| 4,899,859 | 2/1990 | Teraoka | 180/233 X |
| 4,951,775 | 8/1990 | Kittle et al. | 180/244 |
| 4,962,970 | 10/1990 | Jonner et al. | 180/244 X |
| 5,038,884 | 8/1991 | Hamada et al. | 180/233 |
| 5,248,020 | 9/1993 | Kreitzberg | 180/244 |
| 5,441,136 | 8/1995 | Greaves et al. | 180/244 X |

*Primary Examiner*—Kevin T. Hurley
*Attorney, Agent, or Firm*—Griffin, Butler, Whisenhunt & Kurtossy

[57] ABSTRACT

A 4-wheel tractor having brakes on the rear wheels only and an FWD clutch for selectively drivingly coupling the front wheels to the rear wheels, is provided with a control circuit, operative during rear wheel braking, for controlling the clutch so that the front wheels are intermittently coupled to and uncoupled from the rear wheels. Brake pedals which individually control the rear wheel brakes, and a hand brake all control switches connected to a controller. An FWD switch is also connected to the controller. A ground speed sensor applies to the controller a signal representing the speed of the tractor. If the tractor speed is above 15 mph at the time both brake pedals are depressed, the controller selectively controls a solenoid so that the clutch is selectively engaged and disengaged in a first sequence if the FWD switch is ON but selectively controls the solenoid so that the clutch is selectively engaged and disengaged in a second sequence if the FWD switch is in an OFF or an AUTO position. Operation of the clutch effects intermittent front wheel braking as the rear wheels are braked so that front wheel skidding is reduced during hard braking.

12 Claims, 4 Drawing Sheets

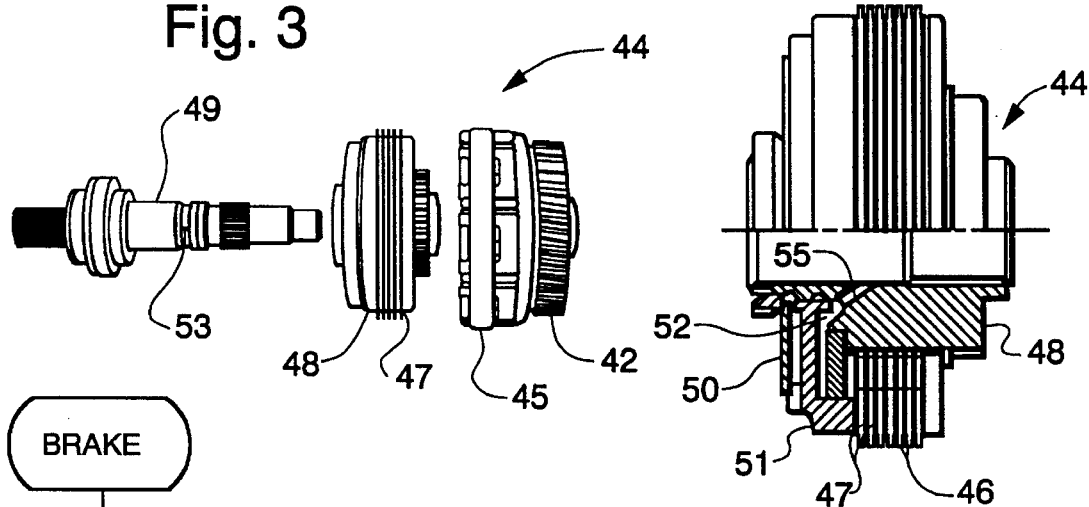
Fig. 3
Fig. 4
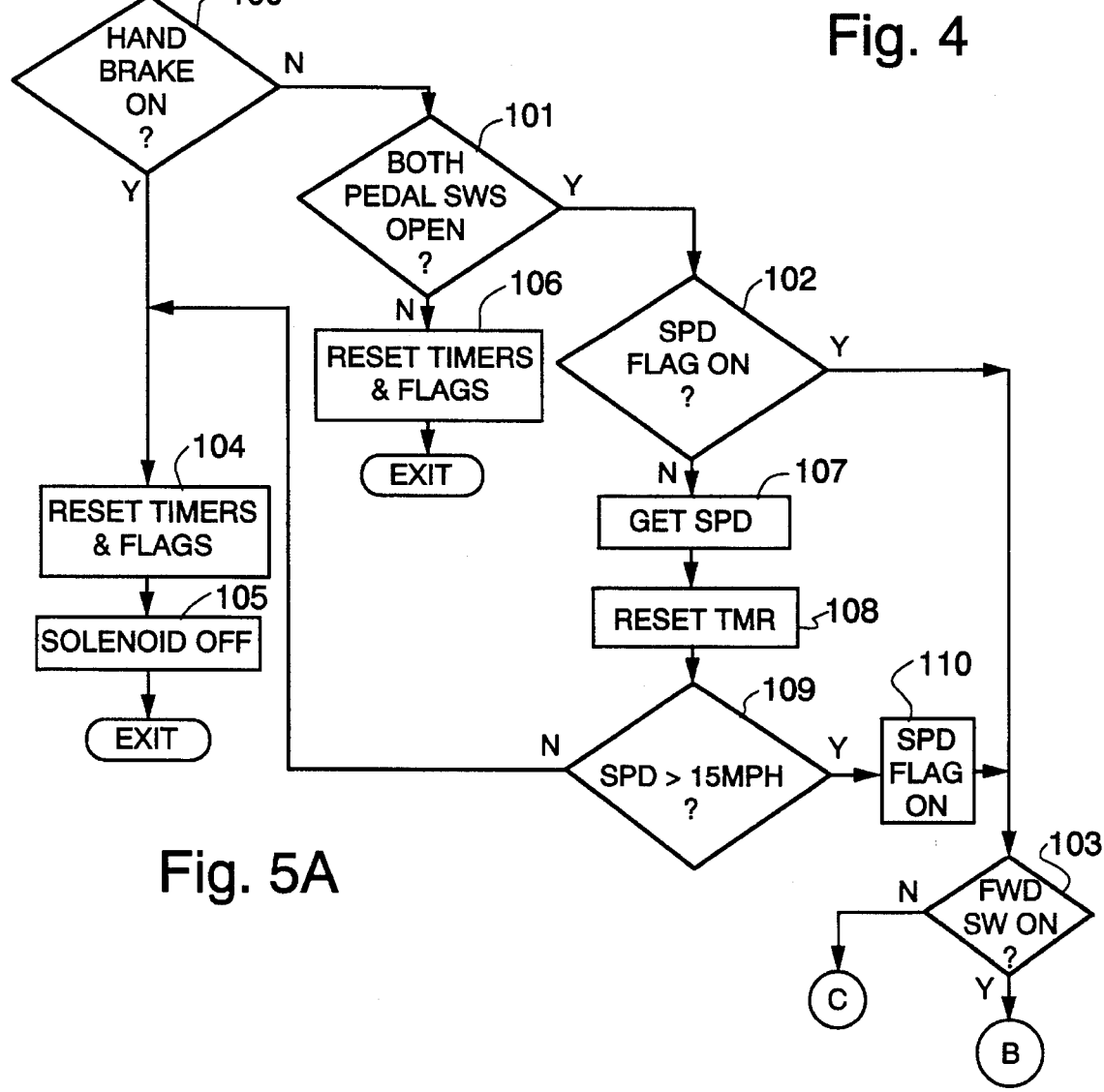
Fig. 5A

MODULATED FWD CLUTCH FOR TRACTOR BRAKING

FIELD OF THE INVENTION

The present invention relates to a method of 4-wheel braking a tractor of the type having brakes on the rear wheels only.

BACKGROUND OF THE INVENTION

In Europe, tractors are used for over-the-highway purposes more than they are in the U.S. When so used, the tractors are always in a two-wheel drive mode for best efficiency and reduced drive line loads. European standards require four-wheel assisted braking for relatively high speed tractors. Therefore, tractors having brakes on the rear wheels only are provided with a front wheel drive clutch that is engaged when a brake pedal is actuated so that braking of the rear wheels also causes braking of the front wheels. U.S. Pat. Nos. 5,248,020, 4,951, 775, 4,811,811 and 4,466,519 illustrate braking systems of this type.

In prior art braking systems the front wheel drive clutch is too aggressive so that during hard braking the front wheels lock up. This causes front wheel skidding and tractor bouncing which in turn may possibly damage the driveline components of the front wheel drive.

SUMMARY OF THE INVENTION

An object of the present invention is to provide a method and apparatus for obtaining improved 4-wheel braking in a tractor having only rear wheel brakes.

Another object of the invention is to provide a method of, and apparatus for, braking a tractor having brakes on the rear wheels only, the method comprising intermittently engaging a front wheel drive clutch to thereby intermittently couple the front wheels to the rear wheels.

In accordance with the principles of the present invention, a tractor having brakes on the rear wheels only and a clutch for coupling the front wheels to the rear wheel drive is provided with a control circuit responsive to a ground speed sensor, a selection switch for selecting four or two wheel drive, and actuation of tractor brake pedal switches for intermittently engaging and disengaging the clutch during braking to thereby selectively couple the front wheels to the rear wheel drive. The control circuit actuates the clutch for front wheel drive braking only if the ground speed of the tractor is greater than a predetermined speed. If the 4/2 wheel drive selection switch is in position to select four wheel drive, the control circuit engages and disengages the clutch in a first sequence and if four wheel drive is not selected the control circuit engages and disengages the clutch in a second sequence.

Other objects and advantages of the invention will become obvious upon consideration of the following description and the accompanying drawings.

BRIEF DESCRIPTION OF THE DRAWINGS

FIG. 3 is an exploded view of the clutch;

FIG. 4 is an elevation view of the clutch, partly in section;

FIGS. 5A–5B comprise a flow-chart illustrating a Brake routine executed by a controller to control 4-wheel tractor braking; and, FIG. 6 shows timing waveforms illustrating the timing of clutch engagement and disengagement during braking.

DESCRIPTION OF A PREFERRED EMBODIMENT

Figure 1:
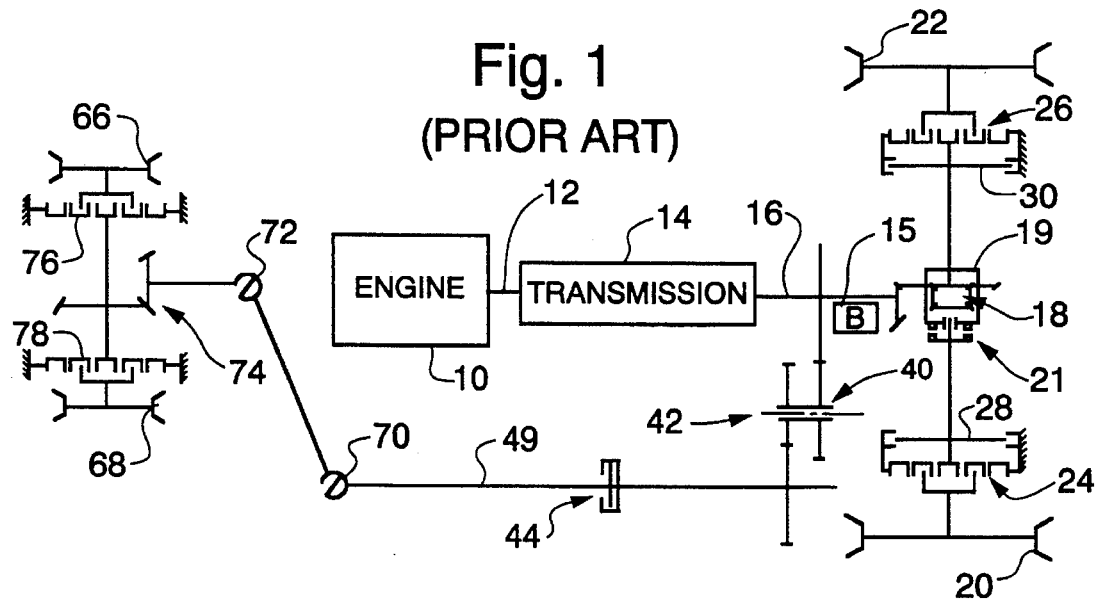
FIG. 1 is a schematic view of a tractor drive and braking system.
Figure 2:
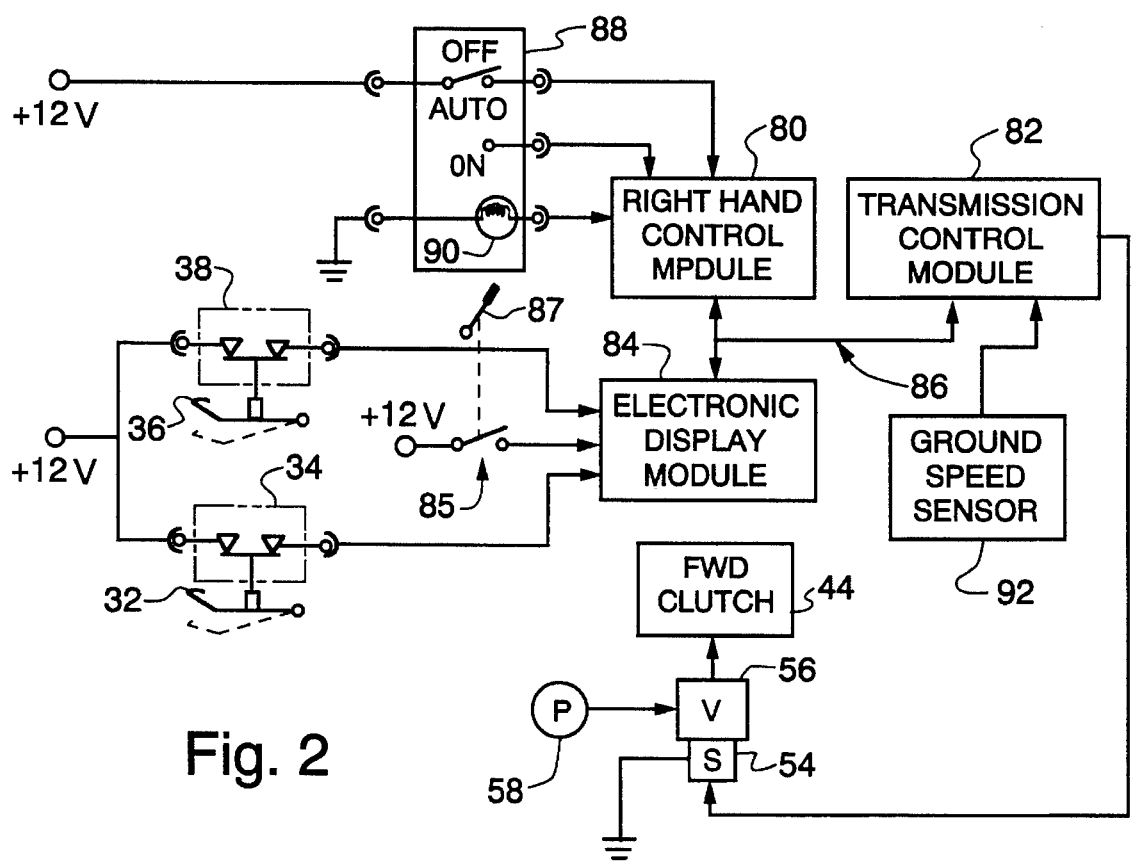
FIG. 2 illustrates an electrical control system for selectively controlling a front wheel clutch.

FIGS. 1 and 2 schematically illustrate a typical tractor drive and control system in which the present invention may be used. In FIG. 1, an engine 10 drives an input shaft 12 of a transmission 14 having an output shaft 16. The transmission output shaft 16 drives a differential mechanism 18 that is housed in a rear axle housing 19 and allows movement of the rear wheels 20, 22 relative to each other. The differential mechanism is provided with a differential lock mechanism 21 which is actuated through a solenoid controlled hydraulic valve (not shown) when the operator operates a differential lock pedal. The differential lock mechanism, when actuated, locks the wheels to impede relative movement between them.

The differential mechanism 18 drives rear wheels 20, 22 through epicyclic gearing 24, 26. Left and right rear brakes 28, 30 are provided for braking the left and right drive wheels 20 and 22, respectively. Left and right rear brakes 28 and 30 may be individually controlled by operation of a left brake pedal 32 which controls a normally closed left brake switch 34 (FIG. 2) or a right brake pedal 36 that controls a normally closed right brake switch 38.

When one of the brake pedals is depressed, it opens the contacts of its corresponding brake switch and causes braking pressure to be applied to the corresponding brake through a conventional hydraulic braking system, not shown. The brake pedals are used individually to assist in turning the tractor. However, operation of the left and right brakes may be interlocked by an operator's lever, not shown, which mechanically interlocks the brake pedals so that depression of either pedal actuates both rear brekes. The pedals are usually interlocked during transport, that is, when the tractor is used for over-the-highway purposes.

A pair of helical gears 40, 42 drive a front wheel drive clutch 44. The gears 40, 42 and FWD clutch 44 are located within the rear axle housing 19 and the drive gear 40 is splined to the transmission output shaft 16. In FIGS. 3 and 4, the driven gear 42 drives the drum 45 of clutch 44. The clutch drive plates 46 extend radially outwardly into drum 45. A center hub 48 is splined to the clutch output shaft 49 and carries the clutch driven plates 47. A spring 50, in the form of a belleville washer normally presses against a piston 51 which in turn urges the clutch drive plates 46 into engagement with the clutch driven plates 47 so that torque is transferred from gear 42 through the drive and driven clutch plates and center hub 48 to the output shaft 49.

A fluid cavity 52 is provided between the piston 51 and drum 48. When hydraulic fluid under pressure is applied to cavity 52, it applies a force to the piston 51 to move the piston to the left as viewed in FIG. 4, thus negating the force applied to the piston by spring 50. This releases the pressure of the driven clutch plates against the drive plates so that torque is no longer transmitted through the clutch.

As shown in FIG. 2, a solenoid 54 selectively controls a valve 56 to admit hydraulic fluid under pressure (nominally 250 psi) to the cavity 52 from a source 58. When the solenoid is energized, hydraulic fluid from source 58 is applied to cavity 52 to disengage the clutch. When the solenoid is not energized, valve 56 blocks the application of fluid to cavity 52 and spring 50 forces the driven plates of the clutch into engagement with the drive plates.

The valve 56 may be connected via tubing to a hole extending axially into output shaft 49 from the right end (FIG. 3) and terminating at one or more circumferential ports 53 that communicate with cavity 52 through one or more channels 55 in center hub 48.

The output shaft 49 of clutch 44 drives the front wheels 66, 68 of the tractor through a drive train including universals 70 and 72, gearing 74 and epicyclic gearing 76 and 78.

As shown in FIG. 2, the electrical system includes a right hand control module 80, a transmission control module 82, and an electronic display module 84 interconnected by a conventional network 86 which enables the transfer of information between the modules. Each of the modules may comprise a programmable microprocessor. As explained in copending application 08/266,509 (assigned to the same assignee as the present application) plural microprocessors may be disposed in several regions of a motorized vehicle so as to permit shorter connecting leads than would be required between a single microprocessor, the elements controlled by the microprocessor, and the sensors and controls providing inputs to the microprocessor. The present invention will work equally well in a system having a single microprocessor.

The left and right brake switches 34, 38 are connected to inputs of module 84 and normally apply +12 V to the module. When either one or both brake switches is/are actuated, the +12 V is disconnected from the module.

A hand or parking brake switch 85 is connected between +12 V and an input of module 84. The switch 85 is normally open and is closed when a hand brake lever 87 is set. The hand brake lever controls a brake 15 which applies a frictional force to transmission output shaft 16.

Module 84 monitors the status of switches 34, 36 and 85 and stores indications of their status. As soon as it gains access to network 86, module 84 transfers these indications to module 82.

A FWD switch 88 is a 3-position manually actuated switch located in the operator's compartment of the tractor. The common terminal of switch 88 is connected to +12 V. The switch has an OFF position (with no output terminal) and ON and AUTO positions with terminals connected to inputs of the module 80. The module monitors the status of switch 88 and each time the position of the switch is changed, the module transmits the new status to module 82 and controls a status lamp 90 associated with the switch to indicate the new status of the switch.

When FWD switch 88 is in the ON position, the FWD clutch 44 is normally engaged. When the switch is in the AUTO position, the FWD clutch is normally engaged at tractor speeds below 15 mph and disengaged at speeds of 15 mph or higher.

Figure 5B:
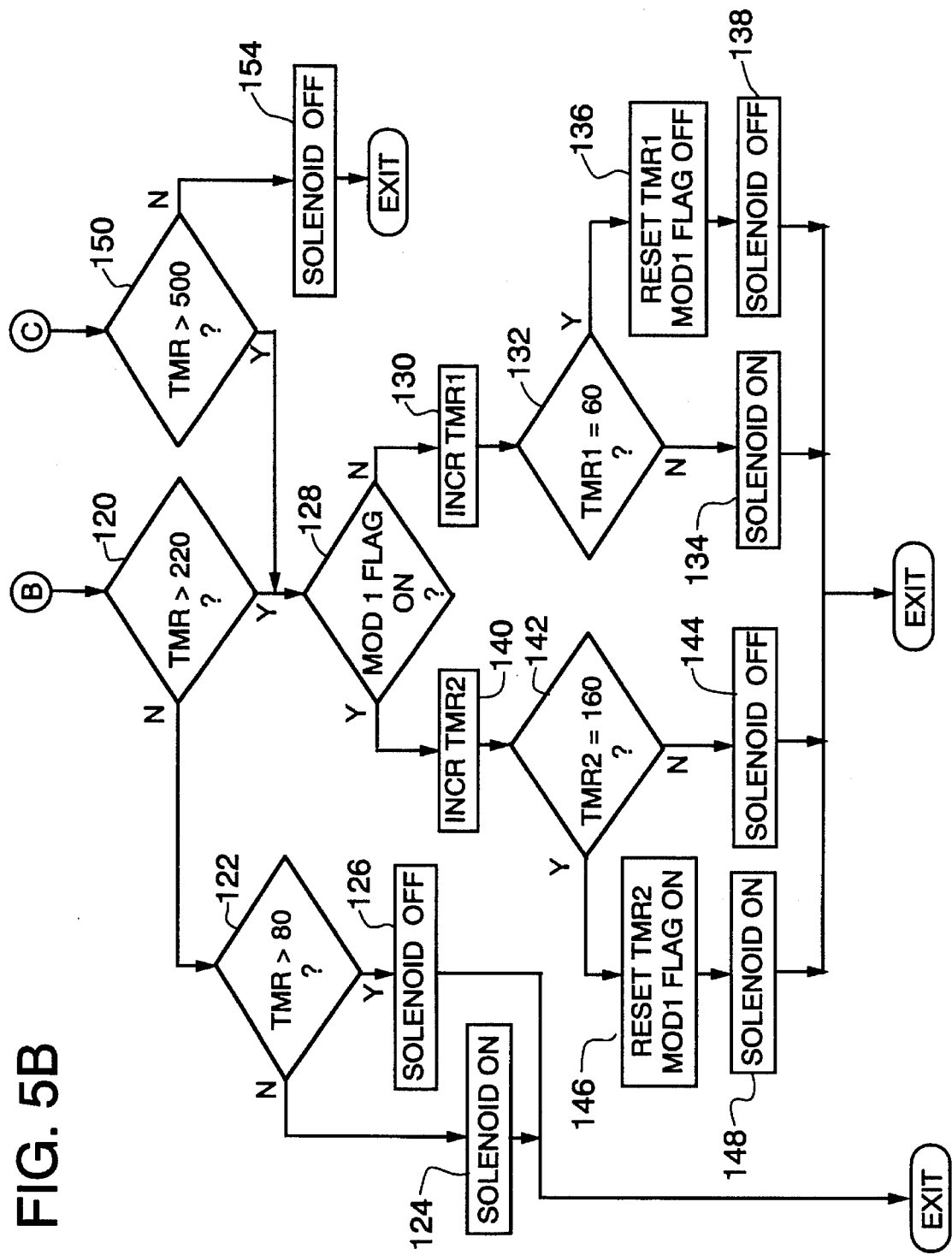

According to the present invention, the module 82 controls the energization of solenoid 54 according to the position of the FWD switch 88, the brake pedal switches 34 and 38, hand brake switch 85, and the speed of the tractor as measured by a ground speed sensor 92 that is connected to module 84. FIGS. 5A and 5B illustrate a routine for selectively energizing solenoid 54 so as to modulate clutch 44 during tractor braking. The tractor braking routine is entered (FIG. 5A) when the hand brake 87 or either brake foot pedal 32 or 36 is actuated.

The routine first checks to determine what braking mode has been initiated. The status of the hand brake switch 85 is tested at step 100 and if the hand brake has not been set (switch 85 open) then step 101 checks to see if both foot pedal switches 34 and 38 are open. If the hand brake is set, various timers and flags used during the routine are reset (step 104) and module 82 sets an output signal (0 volts) that is applied to solenoid 54 (step 105) to turn it off, that is, de-energize it. Valve 56 closes and the pressure in clutch cavity 52 drops so that the spring 50, acting through piston 51, presses the clutch drive plates into engagement with the clutch driven plates. An exit is then made from the routine. The output signal from module 82 is maintained even though an exit is made from the routine. Since the hand brake applies braking force to the transmission output shaft, and since the FWD clutch 44 is engaged, all four wheels are braked.

Module 82 repeatedly executes a program during which it checks the status of brake switches 34, 38 and 85 and enters the Brake routine each time it determines that any of the brake switches is actuated. Therefore, as long as the hand brake is set, the module 82 will repeatedly execute steps 100, 104 and 105. Since. clutch 44 is spring-engaged and disengaged only when solenoid 54 is energized, 4-wheel hand braking will remain in effect even when the tractor ignition is turned off or power to module 82 is interrupted.

If the hand brake is not set, step 101 determines if both brake pedals are depressed. The brake pedals 32, 36 individually control rear brakes 28, 30 since the brakes are used to assist turning the tractor. If step 101 determines that both brake pedal switches 34, 38 are not open, it is assumed that turning is in effect. The timers and flags used during the Brake routine are reset (step 106) and an exit is made from the routine. Since either 2 or 4-wheel drive may be in effect during the turn, the Brake routine does not control the front wheel clutch 44 (via solenoid 54) when only one brake pedal is depressed.

If step 101 determines that both brake pedal switches are open, a speed flag (SPD) is tested (step 102) to determine if it is on. As explained below, if the ground speed of the tractor is 15 mph or less at the time the brakes are first applied the clutch 44 is engaged continuously throughout the braking interval, but if the speed is initially greater than 15 mph the clutch is intermittently engaged and disengaged during braking. The SPD flag, when on, indicates that the ground speed of the tractor was greater than 15 mph at the time the brakes were initially applied.

On the first execution of step 102, the SPD flag is off (reset) so step 107 is executed to get the ground speed from ground speed sensor 92. After a timer (TMR) is reset and restarted (step 108) to begin timing the braking interval, the ground speed is tested (step 109) to determine if it is greater than 15 mph.

If step 109 determines that the speed is less than 15 mph, the FWD clutch 44 is engaged and remains engaged as long as both brake pedals are depressed. The SPD flag is reset at step 104 as the other flags and timers are reset and at step 105 module 82 sets the output to de-energize solenoid 54 thus engaging clutch 44. Since the SPD flag is reset, steps 100–102, 107–109, 104 and 105 are repeated as long as both brake pedals are depressed.

If step 109 determines that the tractor speed is greater than 15 mph at the time braking commences, the SPD flag is turned on (step 110) and at step 103 the module 82 tests the status of FWD switch 88. Depending on the status of the FWD switch, the routine branches to either the clutch modulation sequence beginning at point B in FIG. 5B or the clutch modulation sequence beginning at point C in FIG. 5B.

After one pass through one or the other sequence, an exit is made from the routine. The SPD flag is not reset so the next time the routine is executed, step 102 determines that the flag is set and the routine advances directly from step 102 to step 103. This bypasses steps 107–110 so that (1) TMR continues to toll the braking interval and (2) the speed, which will decrease during braking, will not turn the SPD flag off and terminate clutch modulation.

Assume that at the time the brake pedals are both depressed, the FWD switch is in the ON position. When the switch status is tested at step 103, the routine branches to step 120 (FIG. 5B). The sequence shown in this figure modulates FWD clutch 44 by energizing/de-energizing solenoid 54 according to the following sequence.

| Solenoid 54 | Time (ms) |
| --- | --- |
| ON | 80 |
| OFF | 140 |
| ON* | 60 |
| OFF* | 160 |

Since the sequence is entered only when the FWD clutch is engaged (switch 88 status is "on"), the clutch is first disengaged by energizing solenoid 54. At step 120, TMR, which was reset at step 108, is tested to determine if the timer has timed a 220 ms interval since the brake pedals were depressed. Initially, this test proves false. Next, TMR is tested (step 122) to determine if 80 ms has elapsed since the brake pedals were depressed. Initially, this test also proves false and module 82 sets its output to energize solenoid 54 (step 124) thereby disengaging the clutch. An exit is then made from the routine.

For 80 ms, the sequence of steps 100–103, 120, 122 and 124 is repeated and solenoid 54 remains. When 80 ms has elapsed, the test of TMR at step 122 proves true. Solenoid 54 is turned off (step 126) to engage clutch 44 before an exit is made from the routine.

The clutch remains engaged for 140 ms. During this interval the sequence of steps 100–103, 120, 122 and 126 is repeated and solenoid 54 remains off. At the end of 140 ms (which is 220 ms after the brake pedals were applied) the test at step 120 proves true and the routine advances to step 128 where a MOD1 flag is tested.

After the first 220 seconds of braking, the solenoid is alternately turned on for 60 ms and off for 160 ms until the brake pedals are released. The MOD1 flag determines which interval is being timed and two counters TMR1 and TMR2 time the respective intervals.

When step 128 is first reached, the MOD1 flag will be off. TMR1, initially reset, is incremented at step 130 and tested at step 132 to determine if TMR1 has been incremented to a value representing 60 ms. Initially the test at step 132 proves false so solenoid 54 is energized (step 134) before exiting the routine.

For 60 ms, the sequence comprising steps 100–103, 120, 128, 130, 132 and 134 is repeated and during this interval solenoid 54 remains energized so that clutch 44 is disengaged. When 60 ms has elapsed, the test at step 132 proves true. TMR1 is reset and the MOD1 flag is turned on (step 136) before solenoid 54 is de-energized (step 138) to enable the spring 50 to engage clutch 44.

On the next execution of the Brake routine, the test at step 128 finds the MOD1 flag on so TMR2, initially reset, is incremented (step 140) and tested (step 142) to determine if it has tolled a 160 ms interval. Initially, the test at step 142 proves false so module 82 continues to send a signal to solenoid 54 (step 144) to keep the solenoid de-energized.

The sequence comprising steps 100–103, 120, 128, 140, 142 and 144 is repeated for 160 ms and during this interval solenoid 54 is de-energized so that clutch 44 remains engaged. At the end of the 160 ms interval the test at step 142 proves true. TMR2 is reset and the MOD1 flag is turned off (step 146) before solenoid 54 is energized (step 148) to disengage clutch 44.

On the next execution of the routine the test at step 128 determines that the MOD1 flag is again off so solenoid 54 remains energized until TMR1 has tolled another 60 ms interval. At the end of the interval the MOD1 flag is turned on again (step 136) and solenoid 54 is turned off (step 138) to permit clutch 44 to re-engage. With the MOD1 flag on, the test at step 128 again proves true so solenoid 54 is not energized (step 144) while TMR2 times another 160 ms interval.

Module 82 alternately turns the MOD1 flag on and off as long as the brake pedals are depressed. When the flag is off, the solenoid 54 is energized for 60 ms to disengage the clutch 44 and when the flag is on solenoid 54 is not energized so the clutch engages. When the operator releases the brake pedals (either one or both pedals), the release is detected at step 101. The flags and timers are reset and an exit is made from the Brake routine. Module 82 does not return to the Brake routine until a brake is again actuated.

Assume now that the tractor speed is greater than 15 mph but the FWD switch 88 is in either the AUTO or OFF rather than the ON position when both brake pedals are depressed. In FIG. 5A, on the first execution of the Brake routine, steps 100–102 and 107–110 are carried out in the same manner as described above when the FWD switch was assumed to be ON. However, when step 103 is executed it finds that the FWD switch is not ON so the routine branches to step 150 (FIG. 5B). When entered at step 150, the sequence shown in FIG. 5B modulates FWD clutch 44 by energizing/de-energizing solenoid 54 according to the following sequence.

| Solenoid 54 | Time (ms) |
| --- | --- |
| OFF | 500 |
| ON* | 60 |
| OFF* | 160 |

*repeat 60 ms on and 160 ms off until release of brake pedals.

Since the sequence is only entered when the FWD clutch 44 is not engaged (in the AUTO mode it is automatically disengaged at 15 mph) the sequence first engages the clutch for 500 ms to give an initial period of 4-wheel braking. At step 150, TMR, which was reset at step 108, is tested to determine if 500 ms has elapsed since the brake pedals were depressed. Initially the test at step 150 proves false so at step 154 module 82 sets an output signal to de-energize solenoid 54. This permits spring 50 to engage the clutch. An exit is then made from the routine.

For an interval of 500 ms the module 82 repeats the sequence comprising steps 100–103, 150 and 154 and during this interval solenoid 54 remains off so that clutch 44 is engaged.

After 500 ms the test at step 150 proves true and the routine advances to step 156 where the MOD1 flag is tested. Once step 156 is reached, the routine controls solenoid 54 in exactly the same way as when the FWD switch was ON at the time the brake pedals were depressed. Thus, after an initial period of 500 ms during which clutch 44 is engaged, the clutch is then alternately disengaged for 60 ms and engaged for 160 ms. The selective engagement of the clutch continues until the brake pedals are released.

From the foregoing description it is seen that the present invention provides a novel method and apparatus for accomplishing 4-wheel braking on a tractor having only rear wheel brakes. By selectively engaging and disengaging the clutch between the rear wheel drive and the front wheels the front wheels are intermittently braked as the rear brakes are applied.

Although specific time values are set forth in the preferred embodiment described above, it will be understood that these time values may vary considerably depending on such factors as the size of the clutch and weight of the tractor.

Furthermore, it should be noted that the time values given by way of illustration represent the duration of the signals applied to solenoid 54, not the duration of actual clutch engagement or disengagement. In the described embodiment, there is a lag or delay of about 40 ms between the time a signal is applied to energize solenoid 54 and the time the pressure in cavity 52 rises sufficiently to disengage the clutch plates. The lag is due to the time required for the solenoid 54 and valve to respond to the electrical signal and the time it takes for the pressure in cavity 52 to rise from 0 to about 250 psi.

Similarly, there is a lag of about 80 ms between the time an energizing signal to solenoid 54 is terminated and the time the clutch plates engage. The lag in this case is due to the time it takes for (1) the solenoid to close valve 56, (2) the pressure in cavity 52 to drop, and (3) the spring 50 to push piston 51 against the clutch plates.

Figure 6:
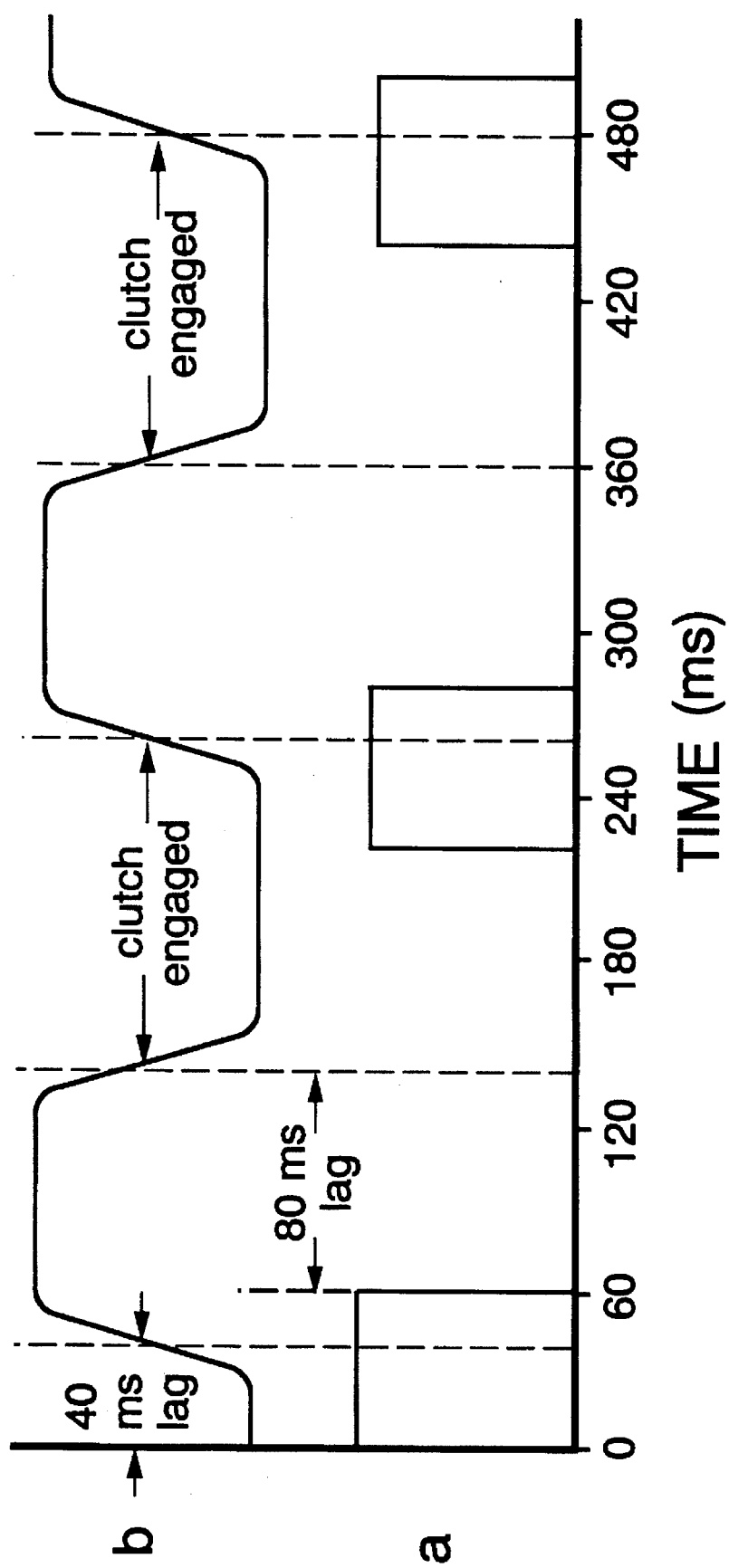

Waveform a of FIG. 6 illustrates the pulses applied to solenoid 54 under the conditions where the FWD switch is in the AUTO or OFF position and the tractor speed is greater than 15 mph at the time the brake pedals are depressed. Waveform a does not show the 500 ms interval during which the solenoid is not energized. That is, zero on the horizontal time scale corresponds to 500 ms after the pedals are depressed. The pulses energizing solenoid 54 are 60 ms in duration with a time interval of 160 ms between pulses. Because of the 40 ms and 80 ms lag times discussed above, these pulses cause the FWD clutch to be engaged for 120 ms intervals separated by 100 ms intervals during which the clutch is disengaged, as illustrated in waveform b.

The waveform of the pulses applied to solenoid 54 under the conditions where the FWD switch is in the ON position and the tractor speed is greater than 15 mph at the time the brake pedals are depressed would be exactly as shown by waveform a but in this case zero on the time scale would correspond to 220 ms after the brake pedals are depressed, the solenoid having been energized earlier for 80 ms and de-energized for 140 ms as previously explained.

A preferred embodiment of the invention has been described in detail for the purpose of illustrating the invention. It will be understood that various modification and substitutions may be made in the described embodiment without departing from the spirit and scope of the invention as defined by the appended claims.

We claim:

1. A method of four-wheel braking a tractor having brakes on the rear wheels only, the tractor having a front wheel drive clutch for drivingly coupling the rear wheels and the front wheels, said method comprising:

sensing the actuation of the brakes on the rear wheels; and, intermittently engaging and disengaging the front wheel drive clutch while the rear wheels are being braked to couple the front and rear wheels whereby braking of the rear wheels causes intermittent braking of the front wheels.

2. A method as claimed in claim 1 wherein the front wheel drive clutch is intermittently engaged and disengaged as long as the brakes are actuated.

3. A method as claimed in claim 1 wherein the front wheel drive clutch is intermittently engaged and disengaged in a first sequence when the front wheel drive clutch is already engaged at the time the brakes are applied, and the front wheel drive clutch is intermittently engaged and disengaged in a second sequence when the front wheel drive clutch is not engaged at the time the brakes are applied.

4. A method as claimed in claim 1 wherein the front wheel drive clutch is intermittently engaged and disengaged during braking of the rear wheels only if the tractor speed is greater than a predetermined speed at the time the brakes are applied.

5. A method as claimed in claim 4 wherein the front wheel drive clutch is engaged continuously during braking of the rear wheels when the tractor speed at the time the brakes are applied is less than said predetermined speed.

6. A method as claimed in claim 3 wherein the front wheel drive clutch is intermittently engaged and disengaged during braking of the rear wheels only if the tractor speed is greater than a predetermined speed at the time the brakes are applied.

7. A method as claimed in claim 6 wherein the front wheel drive clutch is engaged continuously during braking of the rear wheels when the tractor speed at the time the brakes are applied is less than said predetermined speed.

8. A method as claimed in claim 1 wherein the rear brakes may be independently actuated and the front wheel drive clutch is intermittently engaged and disengaged only when both brakes are actuated.

9. In a tractor having a transmission output shaft driving left and right rear wheels and a front wheel drive clutch for selectively drivingly coupling the transmission output shaft to a pair of front wheels, left and right brake pedals for controlling braking of said left and right rear wheels, respectively, and left and right pedal switches responsive to actuation of said left and right brake pedals, respectively for producing first and second signals, the improvement comprising:

control means responsive to said first and second signals for intermittently engaging and disengaging said front wheel drive clutch when said brake pedals are concurrently actuated to thereby intermittently couple said front wheels to said rear wheels when said rear wheels are being braked.

10. The improvement as claimed in claim 9 and further comprising speed sensing means for sensing tractor speed, said control means being responsive to said sensing means for intermittently engaging and disengaging said front wheel drive clutch only if the tractor speed is greater than a predetermined speed when the brake pedals are concurrently actuated.

11. The improvement as claimed in claim 10 wherein said control means is responsive to said speed sensing means for continuously engaging said front wheel drive clutch when the tractor speed is less than said predetermined speed at the time the brake pedals are concurrently actuated.

12. The improvement as claimed in claim 11 wherein said tractor has a front drive switch for selectively controlling said front wheel drive clutch, said front drive switch having ON, OFF and AUTO positions, said control means being responsive to said front drive switch for selectively engaging and disengaging said front wheel drive clutch in a first sequence when said front drive switch is in the ON position at the time the brake pedals are concurrently actuated, or engaging and disengaging said front wheel drive clutch in a second sequence when said front drive switch is in the OFF or AUTO position at the time the brake pedals are concurrently actuated.

* * * * *